(12) United States Patent
Wang et al.

(10) Patent No.: US 11,969,818 B1
(45) Date of Patent: Apr. 30, 2024

(54) SPLIT-TYPE FRICTION STIR WELDING TOOL WITH ADJUSTABLE STIRRING PIN LENGTH

(71) Applicant: Hefei University of Technology, Hefei (CN)

(72) Inventors: Jingfeng Wang, Hefei (CN); Beibei Li, Hefei (CN); Pengcheng He, Hefei (CN); Ao Liu, Hefei (CN)

(73) Assignee: Hefei University of Technology, Hefei (CN)

(*) Notice: Subject to any disclaimer, the term of this patent is extended or adjusted under 35 U.S.C. 154(b) by 0 days.

(21) Appl. No.: 18/473,044

(22) Filed: Sep. 22, 2023

(30) Foreign Application Priority Data

Jul. 5, 2023 (CN) .......................... 202310813424.9

(51) Int. Cl.
*B23K 20/00* (2006.01)
*B23K 20/12* (2006.01)

(52) U.S. Cl.
CPC ................... *B23K 20/1255* (2013.01)

(58) Field of Classification Search
CPC ............ B23K 20/1255; B23K 20/1225; B23K 20/125; B23K 20/126; B23K 20/124; B23K 20/1265; B23K 2101/045; B23K 20/122; B23K 20/123; B23K 20/1245; B23K 20/128; B23K 2103/04; B23K 2103/10; B23K 20/10; B23K 20/1205; B23K 20/1215; B23K 20/1235; B23K 20/1275; B23K 20/129; B23K 2101/04; B23K 2101/06; B23K 2101/10; B23K 2101/14;

(Continued)

(56) References Cited

U.S. PATENT DOCUMENTS 7,793,816 B2 * 9/2010 Burg ..................... B23K 20/126
228/2.1
11,185,945 B2 * 11/2021 Hori ................... B23K 20/1265
(Continued)

FOREIGN PATENT DOCUMENTS

CN 103071915 A 5/2013
CN 103331516 A 10/2013
(Continued)

OTHER PUBLICATIONS

First Office Action issued in counterpart Chinese Patent Application No. 202310813424.9, dated Aug. 7, 2023.
(Continued)

*Primary Examiner* — Erin B Saad
(74) *Attorney, Agent, or Firm* — Westbridge IP LLC

(57) ABSTRACT

A split-type friction stir welding head with an adjustable stirring pin length includes a stirring head housing, where a clamping handle and a detachable stirring pin are successively mounted in the stirring head housing towards a welding direction, the clamping handle is provided with external threads on a periphery thereof and in drive connection with an adjusting plate through threads, the adjusting plate is limited, fixed and mounted in the stirring head housing, and a pore-diameter-adjustable aperture shoulder is mounted between a bottom of the stirring head housing and the detachable stirring pin in order to compensate for an outside gap between a stirring pin channel of the stirring head housing and the detachable stirring pin.

9 Claims, 15 Drawing Sheets

(58) Field of Classification Search
CPC .......... B23K 2101/18; B23K 2103/14; B23K 2103/26; B23K 33/00; B23K 37/0276; B23K 37/0408; B23K 37/0435; B23K 37/0531
See application file for complete search history.

(56) References Cited

U.S. PATENT DOCUMENTS

| | | | | |
|---|---|---|---|---|
| 11,185,946 | B2* | 11/2021 | Hori | B23K 20/122 |
| 2006/0086775 | A1* | 4/2006 | Trapp | B23K 20/1225 228/2.1 |
| 2006/0102699 | A1* | 5/2006 | Burton | B23K 20/123 228/2.1 |
| 2008/0257936 | A1* | 10/2008 | Trapp | B23K 20/124 228/2.3 |
| 2009/0065553 | A1* | 3/2009 | Burg | B23K 20/1255 228/2.1 |
| 2009/0134203 | A1* | 5/2009 | Domec | B23K 37/0531 228/2.1 |
| 2009/0230173 | A1* | 9/2009 | Stol | B23K 20/125 228/2.3 |
| 2011/0180587 | A1* | 7/2011 | Trapp | B23K 20/1265 228/2.1 |
| 2012/0279442 | A1* | 11/2012 | Creehan | C23C 26/00 228/2.1 |
| 2012/0325895 | A1* | 12/2012 | Stol | B23K 20/125 228/2.1 |
| 2013/0134206 | A1* | 5/2013 | Roos | B23K 37/0435 228/2.1 |
| 2018/0133833 | A1* | 5/2018 | Uemura | B23K 20/1245 |
| 2018/0221987 | A1* | 8/2018 | Weigl | B23K 37/0276 |
| 2019/0210147 | A1* | 7/2019 | Karvinen | B23K 20/1215 |
| 2023/0294357 | A1* | 9/2023 | Wu | B29C 64/245 29/592 |

FOREIGN PATENT DOCUMENTS

| | | |
|---|---|---|
| CN | 110653617 A | 1/2020 |
| CN | 112045362 A | 12/2020 |
| CN | 112222604 A | 1/2021 |
| CN | 112658461 A | 4/2021 |
| CN | 214291371 U | 9/2021 |
| CN | 215034447 U | 12/2021 |
| CN | 116275463 A | 6/2023 |
| KR | 20090103346 A | 10/2009 |

OTHER PUBLICATIONS

Grant Notification issued in counterpart Chinese Patent Application No. 202310813424.9, dated Aug. 23, 2023.

* cited by examiner

US 11,969,818 B1

SPLIT-TYPE FRICTION STIR WELDING TOOL WITH ADJUSTABLE STIRRING PIN LENGTH

CROSS-REFERENCE TO RELATED APPLICATION

The application claims priority to Chinese Patent Application No. 202310813424.9, filed on Jul. 5, 2023, which is incorporated herein by reference in its entirety.

TECHNICAL FIELD

The present disclosure relates to the technical field of friction stir welding, and in particular to a split-type friction stir welding tool with an adjustable stirring pin length.

BACKGROUND

As a novel solid-state welding technique developed by The Welding Institute, the friction stir welding (FSW) technique is widely applied in the connection of aluminum alloy and magnesium alloy plates and components, and characterized by good seam quality, low welding temperature, small welding deformation, high welding efficiency, no pollution, etc. At present, there are many kinds of FSW tools, most of which are of integrated design, causing that the stirring pin cannot be repaired but needs to be replaced integrally after being worn or damaged, which results in the waste of the material and the increase of the manufacturing cost. In addition, a majority of the existing FSW tool pin have the fixed length and can only weld a to-be-welded component with single wall thickness correspondingly. When welding the component with different wall thicknesses, the FSW tool pin needs to be frequently changed, which will affect the welding efficiency and cannot adapt to the welding of the component with different wall thicknesses. The patent Application "Friction Stir Welding Tool with Variable Combined Pin Length" with publication No. CN110666339A adopts a bolt and an axial limiting rod to fix a stirring pin, with a simple and reasonable structure and a convenient operation. However, several predetermined lengths of the tool pin can be only selected, a weldable plate has a few thickness types, and therefore a weldment with a non-predetermined thickness cannot be welded. The patent Application "Friction Stir Welding Apparatus with Adjustable Tool Pin Length and Welding Method" with publication No. CN10740773B adopts an ultrasonic detector, a drive motor, an operation controller, a hydraulic pump and the like to determine and control the stirring pin length, with a high employment and maintenance cost, a poor precision of the stirring pin length, and a poor welding effect. Moreover, all the above patents fail to eliminate a gap between a tapered stirring pin and a shoulder when a length of the tapered stirring pin changes, thereby affecting the welding quality.

SUMMARY

In order to solve the above-mentioned problem, the present disclosure aims at providing a split-type friction stir welding tool with an adjustable tool pin length, which may implement the random length adjustment of the stirring pin to adapt to the welding of different plate thicknesses by a threaded drive connection between a clamping handle and an adjusting plate, and setting a pore-diameter-adjustable aperture shoulder and a split-type design among various components; a gap between a tapered stirring pin and a shoulder may be eliminated when a length of the tapered stirring pin changes, in order to ensure the welding quality; and at the same time the stirring pin may be disassembled such that the seriously worn or damaged stirring pin is quickly replaced and then the welding cost is reduced.

To achieve the above-mentioned purpose, the technical solution of the present disclosure is achieved as follows.

A split-type friction stir welding tool with an adjustable stirring pin length, including a stirring tool housing, where a clamping handle and a detachable stirring pin are successively mounted in the stirring tool housing towards a welding direction, the clamping handle is provided with external threads on a periphery thereof and in drive connection with an adjusting plate through threads, the adjusting plate is limited, fixed and mounted in the stirring tool housing, and a pore-diameter-adjustable aperture shoulder is mounted between a bottom of the stirring tool housing and the detachable stirring pin in order to compensate for an outside gap between a stirring pin channel of the stirring tool housing and the detachable stirring pin.

Further, the adjusting plate includes a ball screw control shaft and a plurality of balls, a closed path hole and an internal thread trunking that matches with an external thread trunking of the clamping handle are arranged inside the ball screw control shaft, a spiral path hole is formed between the internal thread trunking and the external thread trunking, and both ends of the spiral path hole communicate with those of the closed path hole in order to form a cycle channel and enable the plurality of balls to move continuously and circularly.

Further, including an arc-shaped buckle, where an overlapping portion with a plurality of fixing gears is arranged in a circumferential direction outside the ball screw control shaft, the overlapping portion is carried on a step inside the stirring tool housing, an arc-shaped groove is formed in a circumferential direction of the stirring tool housing, the matched arc-shaped buckle is mounted in the arc-shaped groove, racks that are buckled with the fixing gears correspondingly are arranged on an inner side wall of the arc-shaped buckle, and a top of the inner side wall of the arc-shaped buckle is provided with a limiting buckle which is used for preventing the overlapping portion from moving upwards.

Further, an upper part of the clamping handle is a rectangular block structure while a lower part is provided with an internal thread, and the internal thread is in threaded connection with the external thread at an upper end of the detachable stirring pin.

Further, a top of the rectangular block structure is provided with a plurality of catch bolts, and the plurality of catch bolts tightly resist to a bottom end of a clamping arm of a motor through height adjustment.

Further, an upper part of the stirring tool housing is provided with a flange plate, and a circumferential direction of the flange plate is provided with a plurality of fixing holes, through which the flange plate is fixedly connected with a rotating shaft of the motor.

Further, the pore-diameter-adjustable aperture shoulder includes a top aperture plate, a plurality of rotating blades and a bottom aperture plate, a toothed chain and telescopic columns are arranged at a lower part of the top aperture plate, lower parts of the rotating blades are provided with movable columns while upper parts are provided with telescopic grooves, an upper part of the bottom aperture plate is provided with movable grooves and toothed columns, the toothed chain arranged at the lower part of the top aperture plate engages with the toothed columns arranged at the upper part of the bottom aperture plate, the telescopic columns arranged at the lower part of the top aperture plate stretch into the telescopic grooves arranged at the upper parts of the rotating blades, and the movable columns arranged at the lower parts of the rotating blades stretch into the movable grooves arranged at the upper part of the bottom aperture plate, in order to form the pore-diameter-adjustable aperture shoulder.

Further, a diameter of each of circular holes formed in the top aperture plate and the bottom aperture plate is equal to that of a middle cylinder of the detachable stirring pin.

Further, a cylindrical internal thread hole is formed in a lower bottom end of the stirring tool housing, a bottom end of the bottom aperture plate is provided with a concentric circular ring, and a bottom plate external thread in corresponding fit with the cylindrical internal thread hole is arranged on an upper periphery of the bottom aperture plate.

Further, the detachable stirring pin includes a tapered stirring pin line with a lower part equipped with threads, a middle cylinder, a middle-upper rectangular column and a cylindrical fixing end with an upper part equipped with the external thread.

The present disclosure adopts a split-type design, and various components may be disassembled such that the seriously worn or damaged parts are quickly replaced and the welding cost is reduced. In the present disclosure, the adjusting plate is mounted with the clamping handle in a threaded fit manner and the length that the stirring pin stretches out of the shoulder is controlled by rotating the clamping handle, so that the random length adjustment of the stirring pin may be implemented to adapt to the welding of different panel thicknesses, with the advantages of high precision and convenient operation. The present disclosure adopts the pore-diameter-adjustable aperture shoulder and may implement the any aperture adjustment and the pore diameter adjustment of the shoulder, so as to eliminate the gap changing between the shoulder and the tapered stirring pin and caused by the change of the length that the tapered stirring pin stretches out of the shoulder, or the gap caused when replacing a thicker or thinner detachable stirring pin, thereby ensuring the welding quality.

BRIEF DESCRIPTION OF THE DRAWINGS

The drawings, which constitute a part of the present disclosure, are used to provide a further understanding of the present disclosure, and the exemplary embodiments of the present disclosure and the description thereof are used to explain the present disclosure, but do not constitute improper limitations to the present disclosure.

DETAILED DESCRIPTION OF THE EMBODIMENTS

It is to be noted that embodiments in the present disclosure and features in the embodiments may be combined with each other without conflict. The present disclosure will be described below in detail with reference to drawings and in combination with the embodiments.

Figure 1:
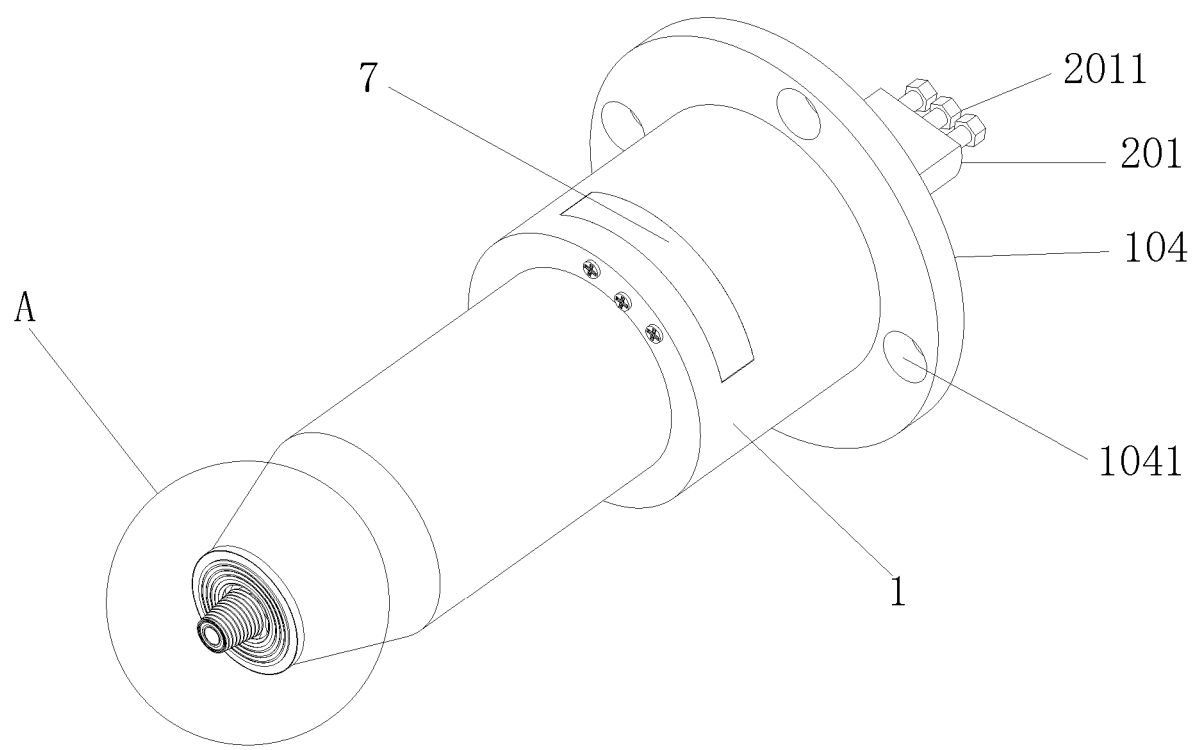
FIG. 1 is a solid structure diagram of a split-type friction stir welding tool with an adjustable stirring pin length in embodiments of the present disclosure.
Figure 2:
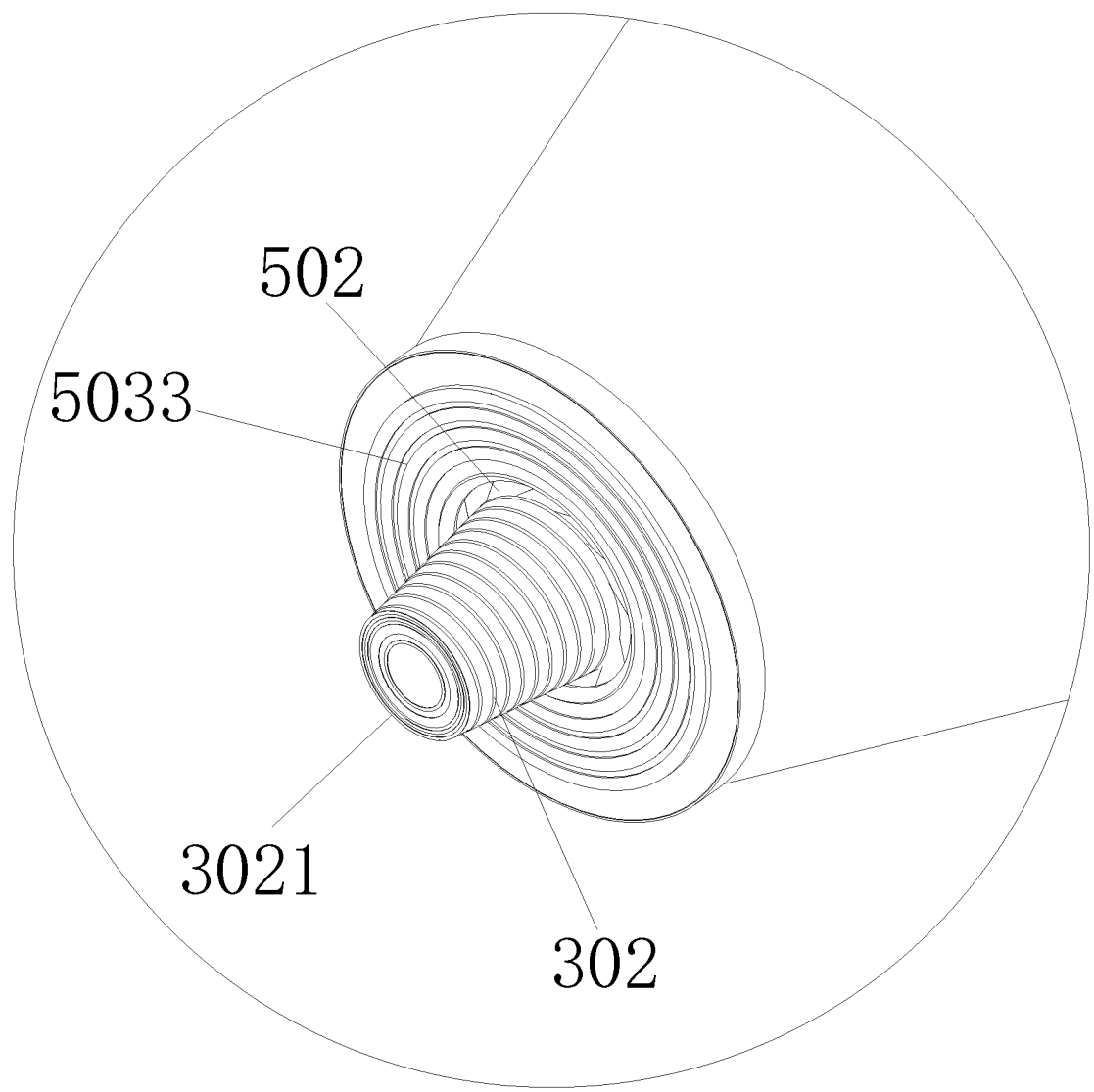
FIG. 2 is an enlarged diagram of a part A in FIG. 1.
Figure 3:
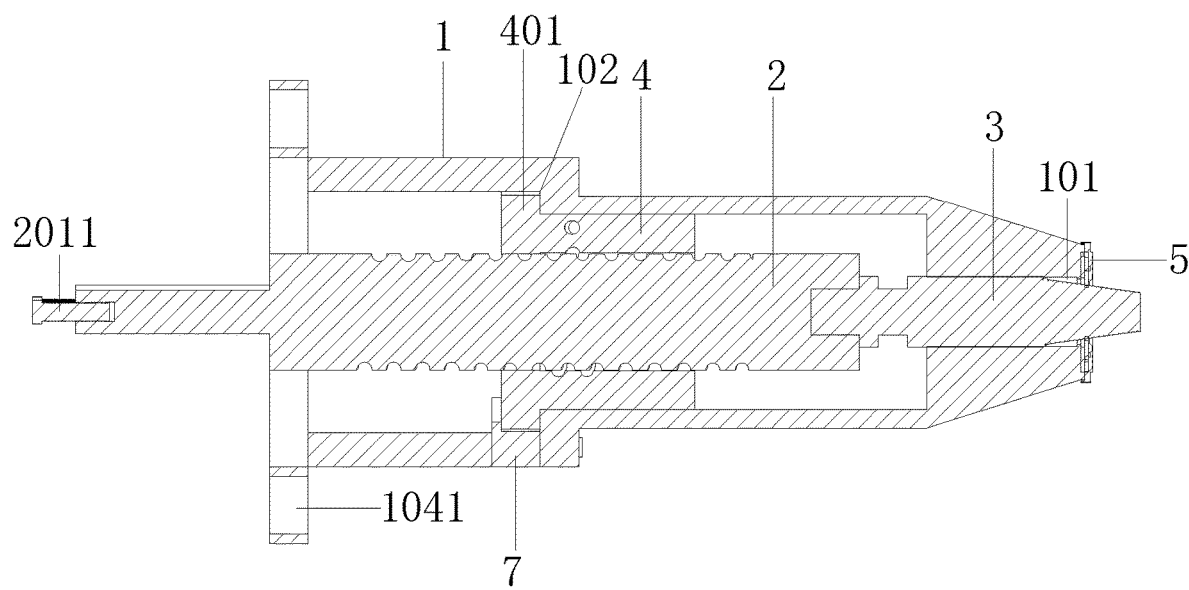
FIG. 3 is a section view of a split-type friction stir welding tool with an adjustable stirring pin length in embodiments of the present disclosure.
Figure 4:
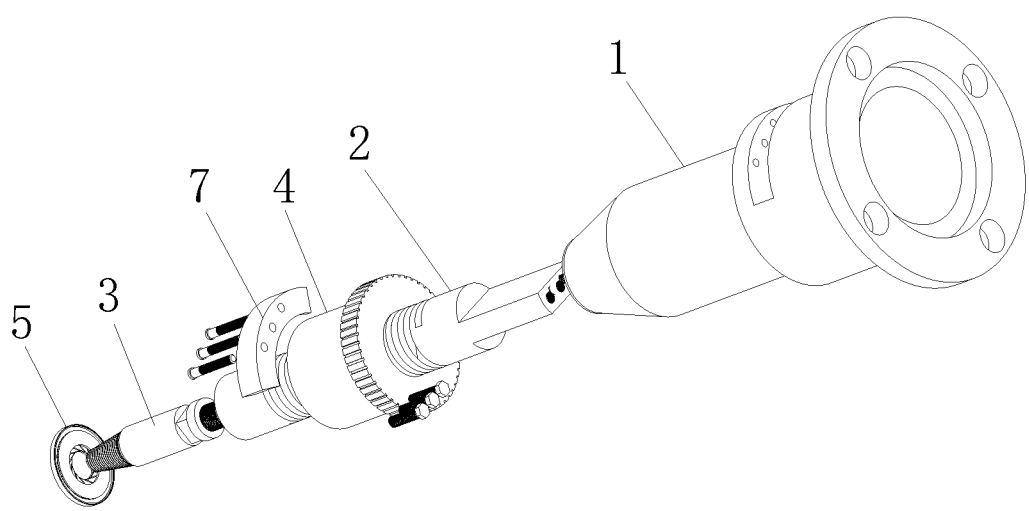
FIG. 4 is an exploded view of a split-type friction stir welding tool with an adjustable stirring pin length in embodiments of the present disclosure.
Figure 5:
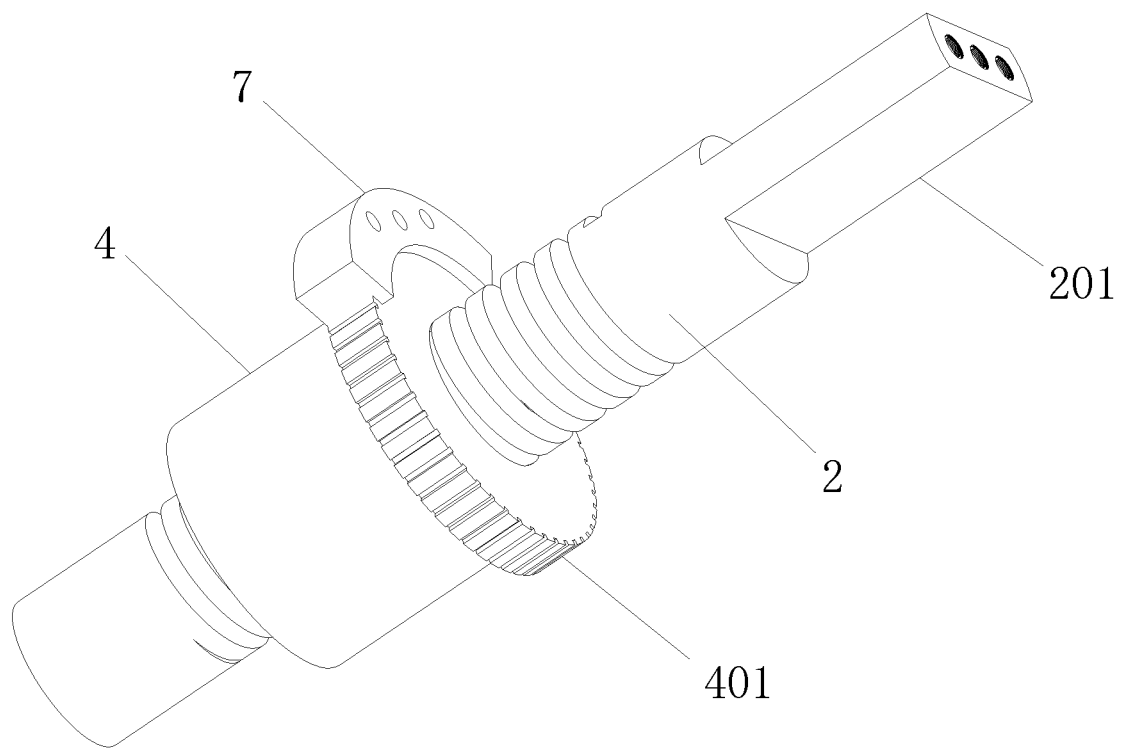
FIG. 5 is a fit installation diagram of a clamping handle, an adjusting plate and an arc-shaped buckle of a split-type friction stir welding tool with an adjustable stirring pin length in embodiments of the present disclosure.
Figure 6:
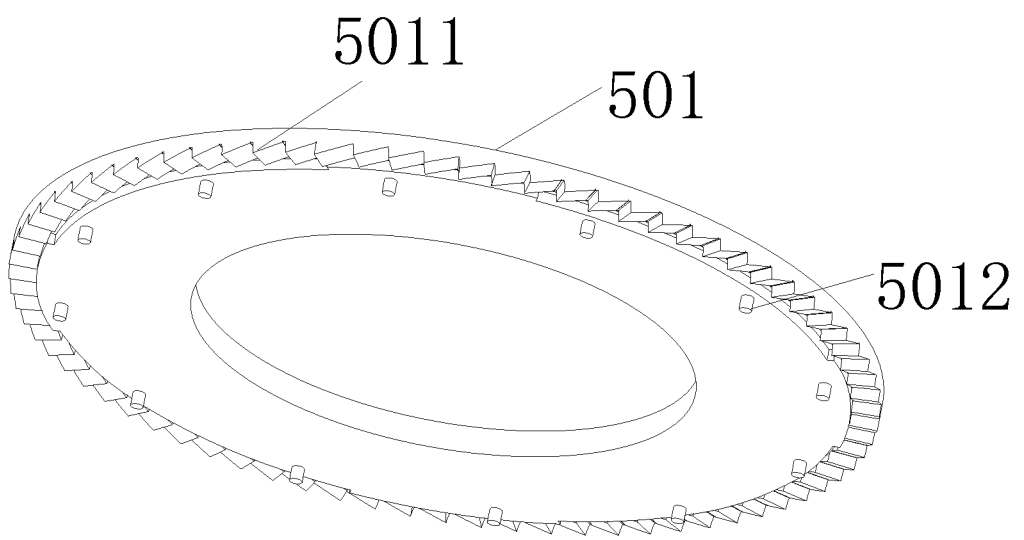
FIG. 6 is a structural diagram of a top aperture plate of a split-type friction stir welding tool with an adjustable stirring pin length in embodiments of the present disclosure.
Figure 7:
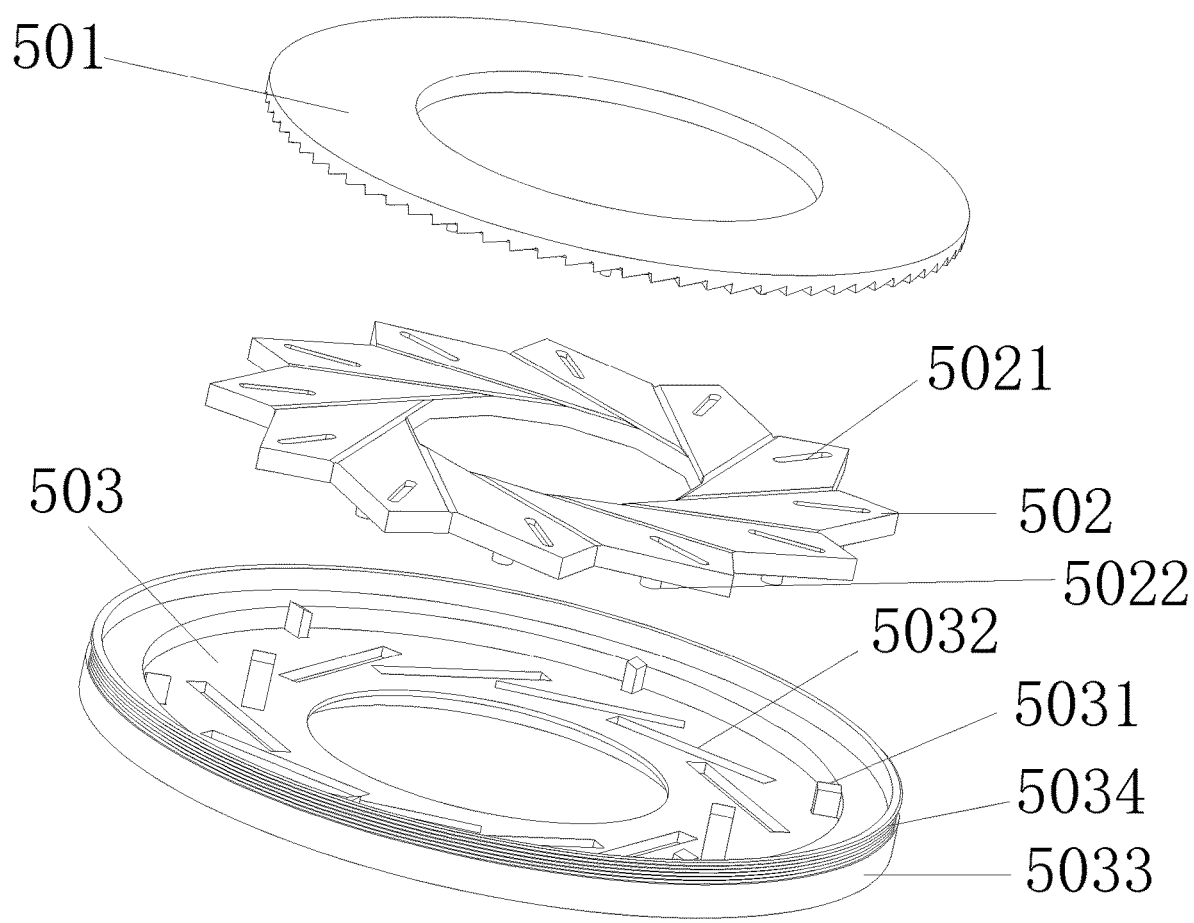
FIG. 7 is an exploded view of a pore-diameter-adjustable aperture shoulder of a split-type friction stir welding tool with an adjustable stirring pin length in embodiments of the present disclosure.
Figure 8:
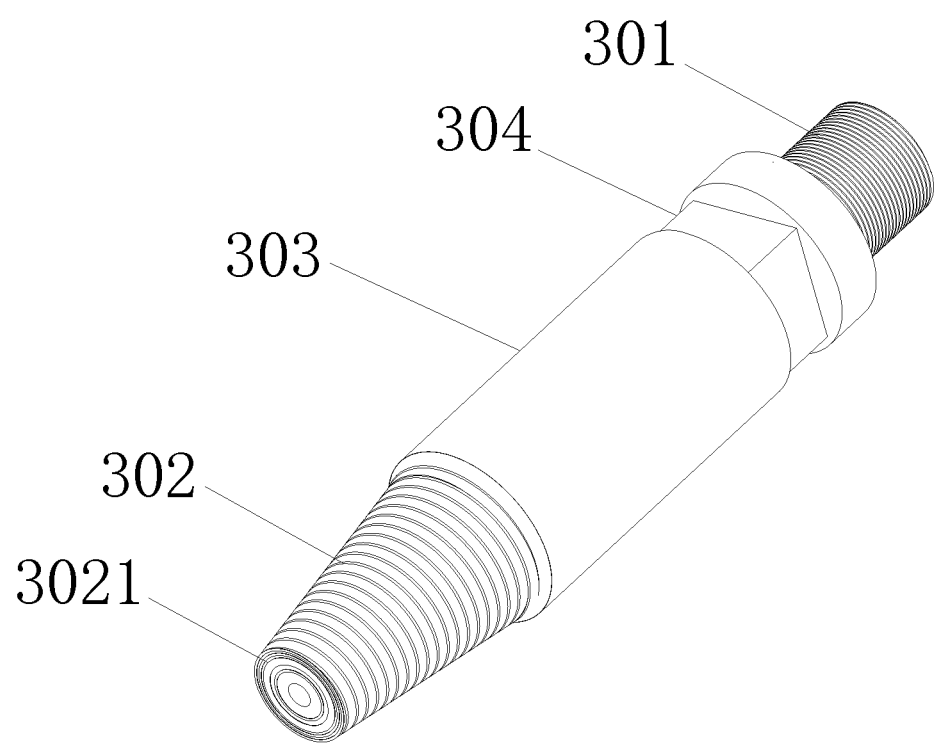
FIG. 8 is a structural diagram of a detachable stirring pin of a split-type friction stir welding tool with an adjustable stirring pin length in embodiments of the present disclosure.
Figure 9:
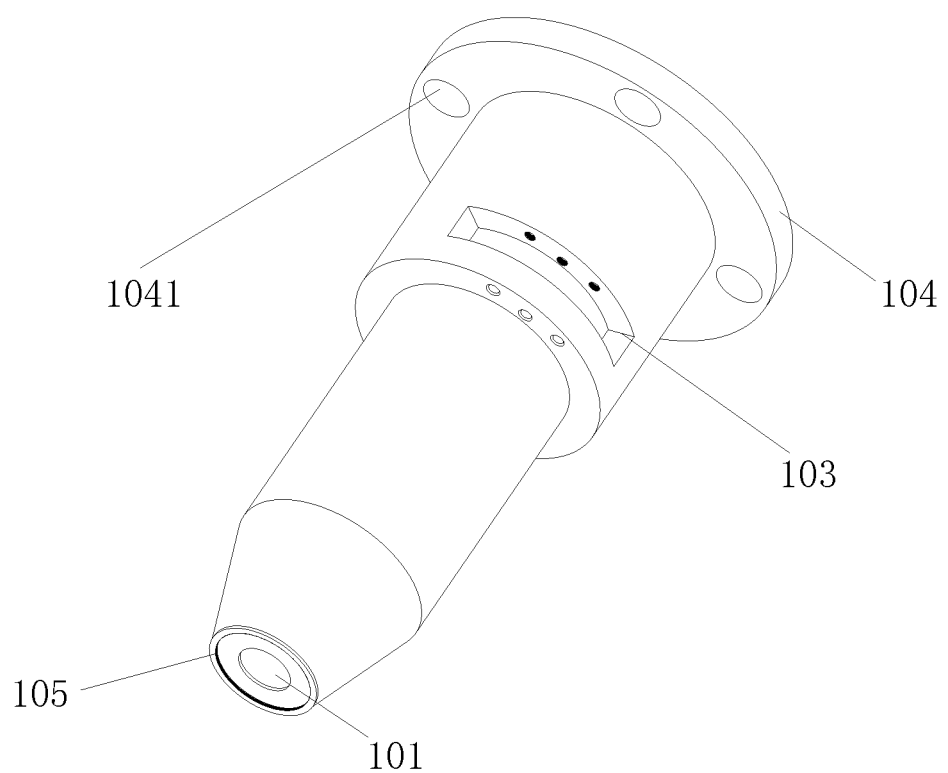
FIG. 9 is a structural diagram of a stirring tool housing of a split-type friction stir welding tool with an adjustable stirring pin length in embodiments of the present disclosure.
Figure 10:
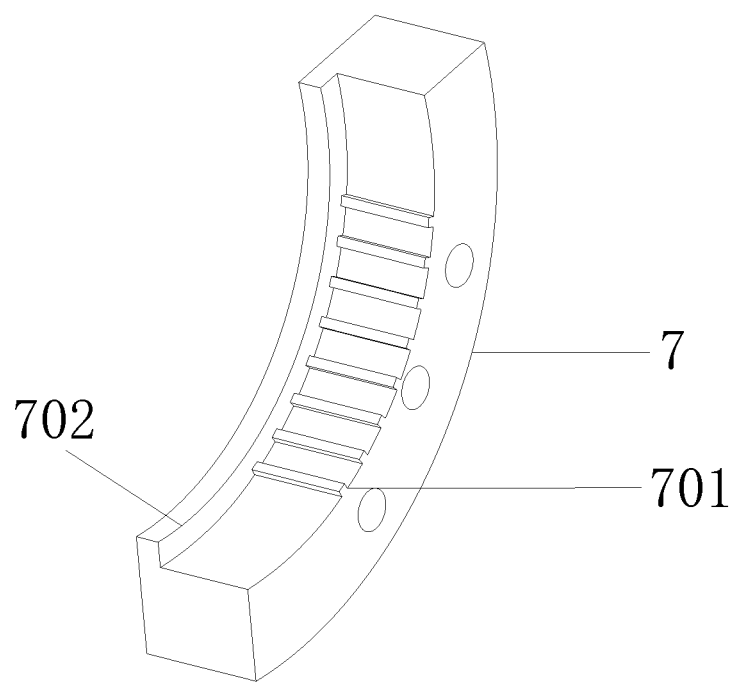
FIG. 10 is a structural diagram of an arc-shaped buckle of a split-type friction stir welding tool with an adjustable stirring pin length in embodiments of the present disclosure.
Figure 11:
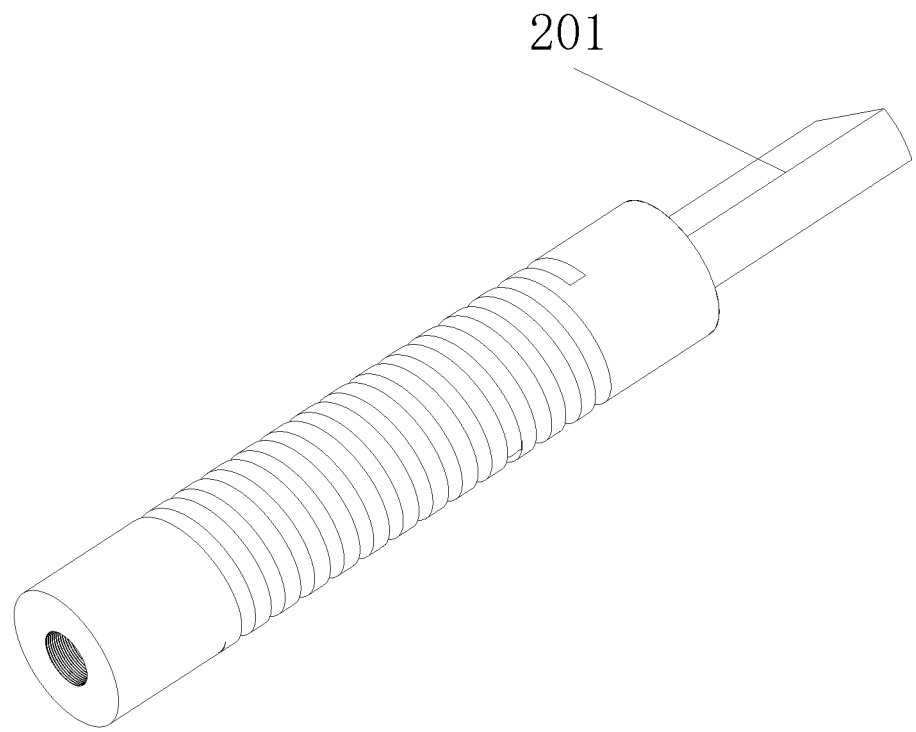
FIG. 11 is a structural diagram of a clamping handle of a split-type friction stir welding tool with an adjustable stirring pin length in embodiments of the present disclosure.
Figure 12:
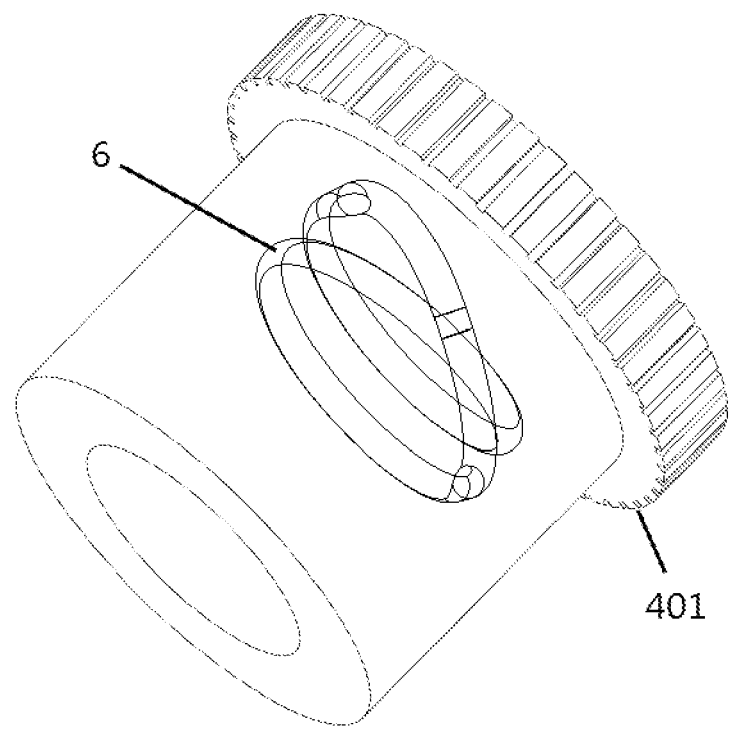
FIG. 12 is a diagram of a cycle channel on a ball screw control shaft of a split-type friction stir welding tool with an adjustable stirring pin length in embodiments of the present disclosure.
Figure 13:
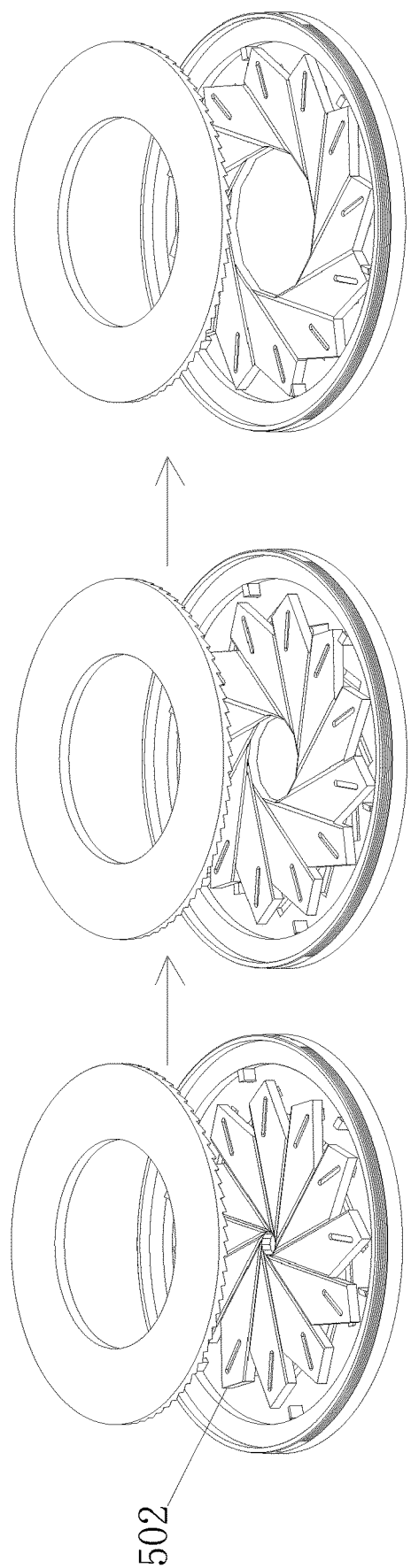
FIG. 13 is an effect diagram I of an increasing pore diameter of a pore-diameter-adjustable aperture shoulder of a split-type friction stir welding tool with an adjustable stirring pin length in embodiments of the present disclosure.
Figure 14:
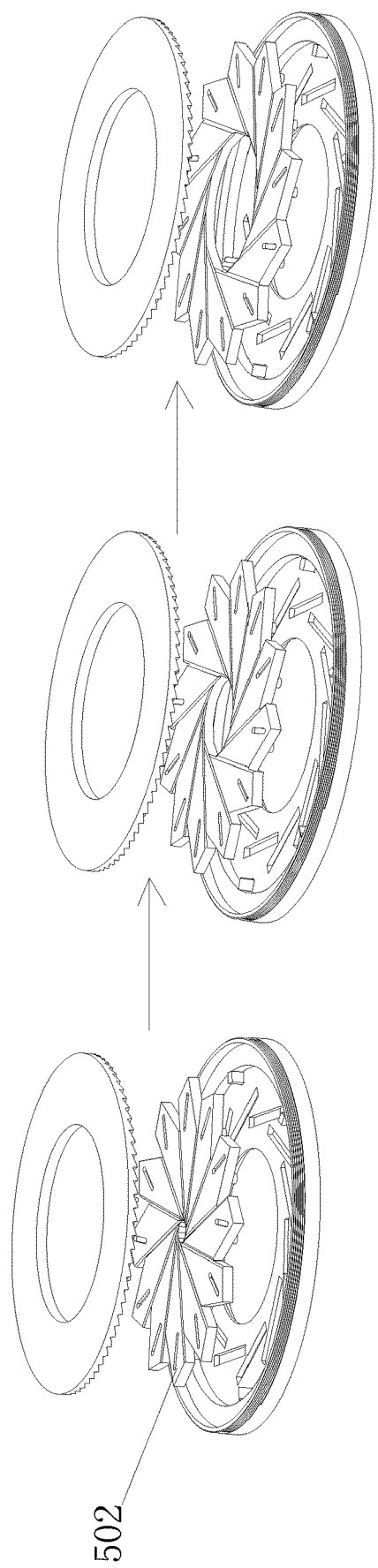
FIG. 14 is an effect diagram II of an increasing pore diameter of a pore-diameter-adjustable aperture shoulder of a split-type friction stir welding tool with an adjustable stirring pin length in embodiments of the present disclosure.
Figure 15:
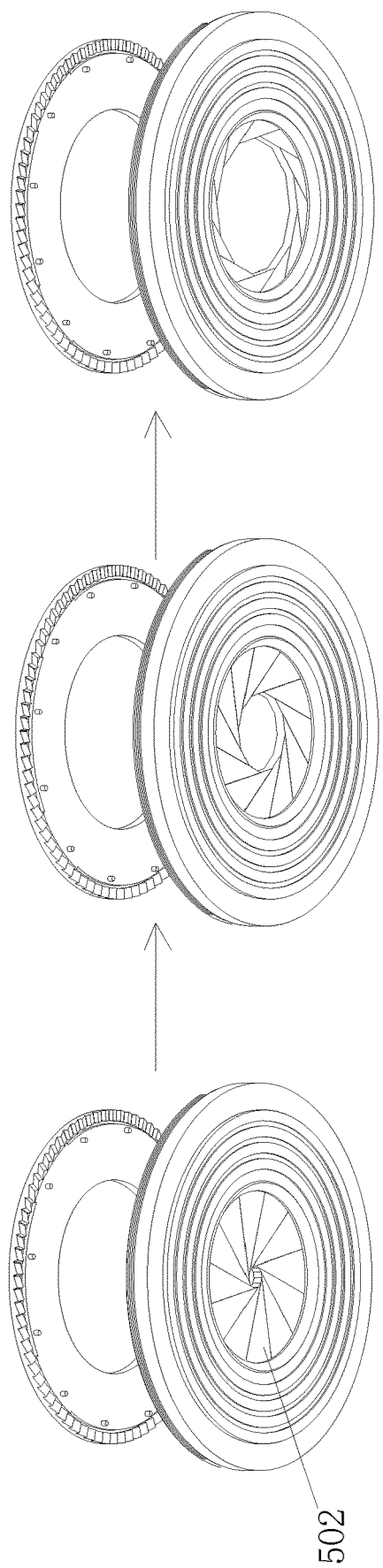
FIG. 15 is an effect diagram III of an increasing pore diameter of a pore-diameter-adjustable aperture shoulder of a split-type friction stir welding tool with an adjustable stirring pin length in embodiments of the present disclosure.
Figure 16:
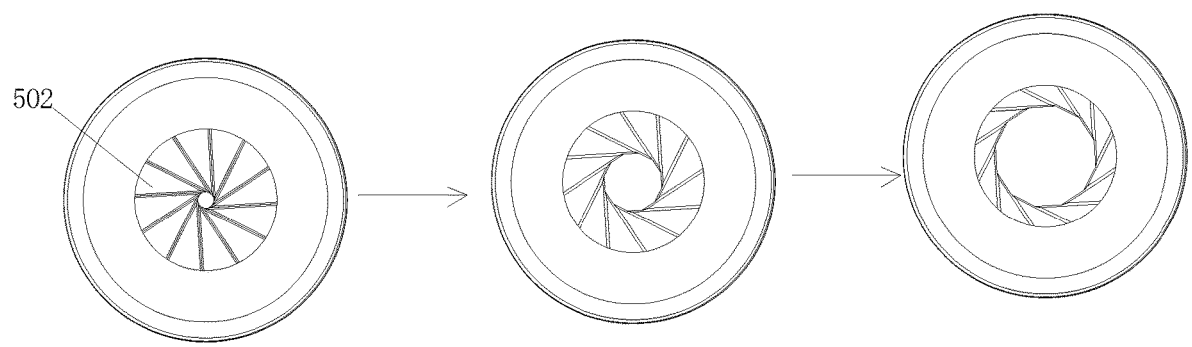
FIG. 16 is an effect diagram IV of an increasing pore diameter of a pore-diameter-adjustable aperture shoulder of a split-type friction stir welding tool with an adjustable stirring pin length in embodiments of the present disclosure.

Referring to FIGS. 1 to 16, a split-type friction stir welding tool with an adjustable stirring pin length, including a stirring tool housing 1, where a clamping handle 2 and a detachable stirring pin 3 are successively mounted in the stirring tool housing 1 towards a welding direction, the clamping handle 2 is provided with external threads on a periphery thereof and in drive connection with an adjusting plate 4 through threads, the adjusting plate 4 is limited, fixed and mounted in the stirring tool housing 1, and a pore-diameter-adjustable aperture shoulder 5 is mounted between a bottom of the stirring tool housing 1 and the detachable stirring pin 3 in order to compensate for an outside gap between a stirring pin channel 101 of the stirring tool housing 1 and the detachable stirring pin 3.

This embodiment adopts a split-type design, and various components may be disassembled such that the seriously worn or damaged parts are quickly replaced and the welding cost is reduced.

In this embodiment, the adjusting plate is mounted with the clamping handle in a threaded fit manner and the length that the stirring pin stretches out of the shoulder is controlled by rotating the clamping handle, so that the random length adjustment of the stirring pin may be implemented to adapt to the welding of different panel thicknesses, with the advantages of high precision and convenient operation.

This embodiment adopts the pore-diameter-adjustable aperture shoulder and may implement any aperture adjustment and the pore diameter adjustment of the shoulder, so as to eliminate the gap changing between the shoulder and the tapered stirring pin and caused by the change of the length that the tapered stirring pin stretches out of the shoulder, or the gap caused when replacing a thicker or thinner detachable stirring pin, thereby ensuring the welding quality.

Moreover, in a specific implementation, the clamping handle and the stirring tool housing in this embodiment are both required to be connected with a rotating end of a motor, in order to achieve the rotation of the whole structure and prevent instability caused by relative rotation, generated between the clamping handle and the adjusting plate.

In a specific embodiment, the adjusting plate 4 includes a ball screw control shaft and a plurality of balls, a closed path hole and an internal thread trunking that matches with an external thread trunking of the clamping handle 2 are arranged inside the ball screw control shaft, a spiral path hole is formed between the internal thread trunking and the external thread trunking, and both ends of the spiral path hole communicate with those of the closed path hole in order to form a cycle channel 6 and enable the plurality of balls to move continuously and circularly.

By forming a ball screw assembly among the ball screw control shaft, the balls and the clamping handle, the adjusting plate in this embodiment may convert a rotating movement of the clamping handle into a precise linear movement between the clamping handle and the ball screw control shaft, in order to drive the detachable stirring pin at the lower part of the clamping handle to move up and down and adjust the length that the detectable stirring pin stretches out of the shoulder.

It is to be noted that the adjusting plate in this embodiment may also be a common screw or a common threaded rod.

In a specific embodiment, further including an arc-shaped buckle 7, where an overlapping portion 401 with a plurality of fixing gears is arranged in a circumferential direction outside the ball screw control shaft, the overlapping portion 401 is carried on a step 102 inside the stirring tool housing 1, an arc-shaped groove 103 is formed in a circumferential direction of the stirring tool housing 1, the matched arc-shaped buckle 7 is mounted in the arc-shaped groove 103, racks 701 that are buckled with the fixing gears correspondingly are arranged on an inner side wall of the arc-shaped buckle 7, and a top of the inner side wall of the arc-shaped buckle 7 is provided with a limiting buckle 702 which is used for preventing the overlapping portion 401 from moving upwards.

In this embodiment, the ball screw control shaft can be limited and fixed through the arc-shaped buckle and the step inside the stirring tool housing to prevent the rotation and up-and-down movement of the ball screw control shaft, such that the adjusting plate is kept stationary relatively when adjusting the length of the stirring pin through the clamping handle, thereby driving the clamping handle to linearly move along the length adjusting direction of the stirring pin.

In a specific implementation, upper and lower end faces of the arc-shaped buckle in this embodiment are provided with three limiting holes spacing 15°, these three limiting holes are consistent with the bolt holes at the lower end of the arc-shaped groove formed in the side wall of the stirring tool housing and the threaded holes at the upper end of the arc-shaped groove, and the arc-shaped buckle is mounted in the arc-shaped groove through three bolts.

In a specific embodiment, an upper part of the clamping handle 2 is a rectangular block structure 201 while a lower part is provided with an internal thread, and the internal thread is in threaded connection with the external thread 301 at an upper end of the detachable stirring pin 3.

The upper rectangular block structure of the clamping handle in this embodiment may be limited and fixed together with the clamping arm of the motor, so as to keep the overall structure of the stirring tool rotating. In this embodiment, the clamping handle may be detached from the detachable stirring pin through a threaded connection.

It is to be noted that the overall rotating direction of the stirring in this embodiment is opposite to the thread locking and mounting direction of the stirring pin, to prevent falling because of inertia.

In a specific embodiment, a top of the rectangular block structure 201 is provided with a plurality of catch bolts 2011, and the plurality of catch bolts 2011 tightly resist to a clamping arm of the motor through height adjustment.

After length adjustment, the stirring pin in this embodiment may be compensated by adjusting the heights of the plurality of catch bolts, keeping a tail end of the clamping handle always resisting to a bottom end of the clamping arm of the motor tightly, and improving the stability of the rotating work of the stirring tool.

In a specific embodiment, an upper part of the stirring tool housing 1 is provided with a flange plate 104, and a circumferential direction of the flange plate 104 is provided with a plurality of fixing holes 1041, through which the flange plate 104 is fixedly connected with a rotating shaft of the motor.

The plurality of fixing holes in this embodiment are four bolt holes spacing 90°, and the stirring tool housing is fixed to a rotating shaft of the motor through the four bolt holes in the flange plate.

In a specific embodiment, the pore-diameter-adjustable aperture 5 shoulder includes a top aperture plate 501, a plurality of rotating blades 502 and a bottom aperture plate 503, a toothed chain 5011 and telescopic columns 5012 are arranged at a lower part of the top aperture plate 501, lower parts of the rotating blades 502 are provided with movable columns 5022 while upper parts are provided with telescopic grooves 5021, an upper part of the bottom aperture plate 503 is provided with movable grooves 5032 and toothed columns 5031, the toothed chain 5011 arranged at the lower part of the top aperture plate 501 engages with the toothed columns 5031 arranged at the upper part of the bottom aperture plate 503, the telescopic columns 5012 arranged at the lower part of the top aperture plate 501 stretch into the telescopic grooves 5021 arranged at the upper parts of the rotating blades 502, and the movable columns 5022 arranged at the lower parts of the rotating blades 502 stretch into the movable grooves 5032 arranged at the upper part of the bottom aperture plate 503, in order to form the pore-diameter-adjustable aperture shoulder 5.

By rotating the top aperture plate, this embodiment changes the positions of the telescopic columns in the telescopic grooves, changes the sizes of the gaps among the rotating blades, and eliminates the gap between the tapered stirring pin and the pore-diameter-adjustable shoulder when the tapered stirring pin elongates and shortens.

In a specific embodiment, the toothed chain arranged at the lower part of the top aperture plate is unsymmetrical, one side of the toothed chain has a big dip angle while the other side has a small dip angle, and the small dip angle anticlockwise rotation direction is set as a forward direction. After engaging with the toothed chain, the toothed columns at the upper part of the bottom aperture plate can only move along the forward direction.

The complete motion process is as follows: the movable columns of the rotating blades are inserted into the movable grooves and pushed to the outermost side thereof, and at this time the stirring pin channel between the rotating blades is completely opened such that the telescopic columns at the lower part of the top aperture plate are inserted into the telescopic grooves. The top aperture plate is rotated along the forward direction, and the telescopic columns rotate around the center of the stirring pin channel (the distance from the center of the stirring pin channel is unchanged). Since the telescopic columns are inserted into the telescopic grooves, which are integrated with the rotating blades, the telescopic columns will drive the rotating blades to rotate accordingly, but the rotation of the rotating blades is limited by the movable grooves, the rotating blades can only move along the directions of the movable grooves for matching with the motion (during a process that the rotating blades translate in the movable grooves, the telescopic columns in the telescopic grooves will displace in the telescopic grooves and always keep the unchangeable distance from the center of the stirring pin channel while rotating), and after the rotating blades move, the stirring pin channel reduces slowly. Rotating the top aperture plate makes the stirring pin channel reduce to a required size, and at this time the stirring pin channel just fits with the stirring pin. Since the top aperture plate has the great dip angle in an opposite direction, the top aperture plate meshes with the toothed chain and cannot rotate, and at this time the positioning and fastening of the top aperture plate are just completed.

It is to be noted that a total of 12 rotating blades are uniformly and annularly arranged in this embodiment, corners of the rotating blades constitute a dodecagon, a geometric center of the dodecagon is the center of the stirring pin channel, and the movable columns of the rotating blades may move on the movable grooves on the bottom aperture plate and can only translate along the movable grooves. A positional relationship between the movable columns and the corners of the rotating blades is a constant value, the distance from the movable columns to the center of the dodecagonal stirring pin channel changes during translation, and this distance increases when moving along outward directions of the movable grooves. Motion trajectories of the corners of the rotating blades are parallel to those of the movable columns, and the distance from the corners to the center of the dodecagonal stirring pin channel is in a positive relationship. The specific relational expression is $R^2=r^2+a^2-2racosA$, where r is the distance from the corners to the center of the stirring pin channel, R is the distance from the movable columns to the center of the stirring pin channel, a is the distance from the movable columns to the corners, and A is the included angle between the corners and the straight line where the movable columns are located and between the corners and the straight line where the movable grooves are located.

In a specific embodiment, a diameter of each of circular holes formed in the top aperture plate 501 and the bottom aperture plate 503 is equal to that of a middle cylinder of the detachable stirring pin 3.

In this embodiment, a diameter of each of circular holes formed in the top aperture plate and the bottom aperture plate is a maximum porosity capable of being adjusted among the rotating blades, and the maximum porosity may allow the middle cylinder of the detachable stirring pin to pass through.

In a specific embodiment, a cylindrical internal thread hole 105 is formed in a lower bottom end of the stirring tool housing 1, a bottom end of the bottom aperture plate 503 is provided with a concentric circular ring 5033, and a bottom plate external thread 5034 in corresponding fit with the cylindrical internal thread hole 105 is arranged on an upper periphery of the bottom aperture plate 503.

The pore-diameter-adjustable aperture shoulder in this embodiment may be mounted in the corresponding cylindrical internal threaded holes in the lower part of the stirring tool housing through the bottom plate external threads on the bottom aperture plate for easy installation, maintenance, replacement and disassembly.

The concentric circular ring in this embodiment may increase the friction heat generation efficiency of the shoulder and make the plasticized metal not fly out.

In a specific embodiment, the detachable stirring pin 3 includes a tapered stirring pin line 302 with a lower part equipped with threads 3021, a middle cylinder 303, a middle-upper rectangular column 304 and a cylindrical fixing end with an upper part equipped with the external thread 301.

When the detachable stirring pin in this embodiment is subjected to length adjustment, since the lower part is the threaded tapered stirring pin line, an inevitable change will occur to the gap between the tapered stirring pin line and the stirring pin channel after adjustment, and at this time, a gap compensation may be performed through the pore-diameter-adjustable aperture shoulder.

The lower part of the tapered stirring pin line in this embodiment is threaded, which can increase the friction heat generation efficiency of the shoulder and reduce the probability that the plasticized metal flies out.

The above are only optional embodiments of the present disclosure and not intended to limit the present disclosure. Any modifications, equivalent replacements, improvements and the like made within the spirit and principle of the present disclosure shall fall within the protection scope of the present disclosure.

What is claimed is:

1. A split-type friction stir welding tool with an adjustable stirring pin length, comprising a stirring tool housing, wherein a clamping handle and a detachable stirring pin are successively mounted in the stirring tool housing towards a welding direction, the clamping handle is provided with external threads on a periphery thereof and in drive connection with an adjusting plate through threads, the adjusting plate is fixedly mounted in the stirring tool housing in a position limiting way, a diameter-adjustable aperture shoulder is mounted between a bottom of the stirring tool housing and the detachable stirring pin in order to compensate for an outside gap between a stirring pin channel of the stirring tool housing and the detachable stirring pin, the detachable stirring pin is a tapered stirring pin, the diameter-adjustable aperture shoulder comprises a top aperture plate, a plurality of rotating blades and a bottom aperture plate, a toothed chain and telescopic columns are arranged at a lower part of the top aperture plate, lower parts of the rotating blades are provided with movable columns while upper parts are provided with telescopic grooves, an upper part of the bottom aperture plate is provided with movable grooves and toothed columns, the toothed chain arranged at the lower part of the top aperture plate engages with the toothed columns arranged at the upper part of the bottom aperture plate, the telescopic columns arranged at the lower part of the top aperture plate stretch into the telescopic grooves arranged at the upper parts of the rotating blades, and the movable columns arranged at the lower parts of the rotating blades stretch into the movable grooves arranged at the upper part of the bottom aperture plate, in order to form the diameter-adjustable aperture shoulder.

2. The split-type friction stir welding tool with the adjustable stirring pin length according to claim 1, wherein the adjusting plate comprises a ball screw control shaft and a plurality of balls, a closed path hole and an internal thread that matches with an external thread of the clamping handle are arranged inside the ball screw control shaft, a spiral path hole is formed between the internal thread and the external thread, and both ends of the spiral path hole communicate with those of the closed path hole in order to form a cycle channel and enable the plurality of balls to move continuously and circularly.

3. The split-type friction stir welding tool with the adjustable stirring pin length according to claim 2, further comprising an arc-shaped buckle, wherein an overlapping portion with a plurality of fixing gears is arranged in a circumferential direction outside the ball screw control shaft, the overlapping portion is carried on a step inside the stirring tool housing, an arc-shaped groove is formed in a circumferential direction of the stirring tool housing, the matched arc-shaped buckle is mounted in the arc-shaped groove, racks that are buckled with the fixing gears correspondingly are arranged on an inner side wall of the arc-shaped buckle, and a top of the inner side wall of the arc-shaped buckle is provided with a limiting buckle which is used for preventing the overlapping portion from moving upwards.

4. The split-type friction stir welding tool with the adjustable stirring pin length according to claim 1, wherein an upper part of the clamping handle is a rectangular block structure while a lower part is provided with an internal thread, and the internal thread is in threaded connection with the external thread at an upper end of the detachable stirring pin.

5. The split-type friction stir welding tool with the adjustable stirring pin length according to claim 4, wherein a top of the rectangular block structure is provided with a plurality of catch bolts, and the plurality of catch bolts tightly resist to a bottom end of a clamping arm of a motor through height adjustment.

6. The split-type friction stir welding tool with the adjustable stirring pin length according to claim 1, wherein an upper part of the stirring tool housing is provided with a flange plate, and a circumferential direction of the flange plate is provided with a plurality of fixing holes, through which the flange plate is fixedly connected with a rotating shaft of the motor.

7. The split-type friction stir welding tool with the adjustable stirring pin length according to claim 1, wherein a diameter of each of circular holes formed in the top aperture plate and the bottom aperture plate is equal to that of a middle cylinder of the detachable stirring pin.

8. The split-type friction stir welding tool with the adjustable stirring pin length according to claim 1, wherein a cylindrical internal thread hole is formed in a lower bottom end of the stirring tool housing, a bottom end of the bottom aperture plate is provided with a concentric circular ring, and a bottom plate external thread in corresponding fit with the cylindrical internal thread hole is arranged on an upper periphery of the bottom aperture plate.

9. The split-type friction stir welding tool with the adjustable stirring pin length according to claim 1, wherein the detachable stirring pin comprises a tapered stirring pin line with a lower part equipped with threads a middle cylinder, a middle-upper rectangular column and a cylindrical fixing end with an upper part equipped with the external thread.

\* \* \* \* \*